United States Patent [19]
Jirnov et al.

[11] Patent Number: 5,511,525
[45] Date of Patent: Apr. 30, 1996

[54] SLIDING-BLADE HEAT ENGINE WITH VORTEX COMBUSTION CHAMBER

[76] Inventors: Alexei Jirnov; Olga Jirnov, both of 5490 Braesvalley, Apt. 420, Houston, Tex. 77096

[21] Appl. No.: 400,764

[22] Filed: Mar. 8, 1995

[51] Int. Cl.⁶ ........................................ F02G 3/00
[52] U.S. Cl. ................... 123/204; 60/39.464; 123/236; 418/255
[58] Field of Search .................... 60/39.63, 39.464; 123/204, 236; 418/235, 255, 264

[56] References Cited

U.S. PATENT DOCUMENTS

| | | | |
|---|---|---|---|
| 2,562,698 | 7/1951 | Clerc | 418/264 |
| 2,635,564 | 4/1953 | Havemann | 60/39.464 |
| 2,706,150 | 4/1955 | Lloyd | 60/39.464 |
| 2,707,444 | 5/1955 | Loon | 60/39.464 |
| 3,324,840 | 6/1967 | Linn | 123/236 |
| 3,989,011 | 11/1976 | Takahashi | 123/204 |
| 4,059,415 | 11/1977 | Kosaka et al. | 60/39.464 |
| 4,098,256 | 7/1978 | Sieck | 123/204 |
| 4,478,135 | 10/1984 | Irwin | 60/39.63 |
| 5,144,802 | 9/1992 | Ruzic | 418/255 |

FOREIGN PATENT DOCUMENTS

| | | | |
|---|---|---|---|
| 448649 | 5/1948 | Canada | 60/39.63 |
| WO80/00170 | 2/1980 | WIPO | 123/204 |

*Primary Examiner*—Michael Koczo
*Attorney, Agent, or Firm*—Kenneth A. Roddy

[57] ABSTRACT

A sliding-blade heat engine having a vortex combustion chamber and oval-shaped turbine and compressor chambers with cylindrical turbine and compressor rotors rotatably mounted eccentrically therein, Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by a shafts in concentric relation whereby rotation of the turbine rotor causes simultaneous rotation of the compressor rotor and the guide elements traveling in the guide grooves cause the blades to extend and retract radially with their outer ends following the inner periphery of the respective chamber side wall with a constant clearance. The turbine rotor is rotated by working fluid from the vortex combustion chamber which causes rotation of the compressor rotor. rotation of the compressor rotor draws air into the compressor chamber, compresses it, and discharges it. The discharged compressed air is mixed with a portion of heated working fluid discharged from the turbine chamber in a thermal exchange recuperator and the heated compressed air is conducted to the combustion chamber.

19 Claims, 7 Drawing Sheets

SLIDING-BLADE HEAT ENGINE WITH VORTEX COMBUSTION CHAMBER

BACKGROUND OF THE INVENTION

1. Field of the Invention

This invention relates generally to piston engines, and more particularly to a sliding-blade heat engine with a vortex combustion chamber.

2. Brief Description of the Prior Art

Piston engines are well known in the prior art. In general, the prior art piston engines employ a piston that moves up and down inside a cylinder with the piston connected to a crankshaft via a connecting rod which then translates the linear up and down motion into rotational motion. This rotational motion is then used, via a gear box or other transmission mechanism, to cause rotation of a drive mechanism to thereby impart motion to a movable vehicle.

However, conventional reciprocating piston engines have relatively complicated designs and have large energy losses associated with the conversion of the energy from the combustion of the fuel into the kinetic energy associated with work or movement.

The total mechanical losses in a piston engine can be presented as the sum of piston/ring assembly friction losses, camshaft and valving friction losses, compression and throttling work losses, and crankshaft and auxiliary devices losses. Frictional losses increase with RPM and at full speed can reach 25% of the total losses or more. Approximately 50% of the friction loss emanates from the piston/ring and cylinder interface.

In the present engine, the quantity of engaging parts is minimized and their interaction is accomplished by means of rolling which minimizes substantial friction losses compared with conventional piston engines.

Another source of mechanical loss, which is unique to the reciprocating piston engine, is an unavoidable consequence of combustion dynamic. During the process of ignition and combustion, very high pressure is spontaneously developed on the top of the piston. Due to the length of time required to complete combustion, the ignition point is usually advanced from top dead center causing an additional retarding force to develop which acts against the upward movement of the piston, thus, reducing fuel efficiency and maximum power output.

The combustion process in these dynamic conditions impedes completeness of fuel combustion that results in elevated emission of toxic components in the exhaust gases. Moreover, reciprocating piston engines require high quality fuel and the necessity of filling the cylinder volume with a dense charge of air, making exhaust heat regeneration non-suitable.

Conditions essential for reliable ignition and sustained combustion of fuel in the combustion chamber of conventional piston engines limit the value of the coefficient of air redundancy ($\alpha$), which leads to high temperature of combustion products in the reaction zone and causes elevated emission of NOx.

In comparison, the vortex combustion chamber of the present invention is able to confine flame and work, thus preventing flame-out with improved completeness of combustion over the wide range of the coefficient of air redundancy ($\alpha$) at non-stationary air supply. This feature decreases the toxicity of the components of the exhaust gasses considerably (including NOx), and also allows the successful use of different liquid fuels and gaseous low-grade hydrocarbon fuels, including processed products of agriculture.

Another important parameter which affects the thermodynamic performance of the conventional reciprocating piston engine is volumetric efficiency. This volumetric efficiency still remains low, typically 75% to 85% in very advanced spark ignition (SI) engines.

The presence of the crank mechanism, cylinder block, and multiple other parts in the conventional reciprocating piston engine, the pulsating character of the working process, and the limited gas distribution capacity provide principal difficulties in improving the volumetric efficiency parameter. None of these constrictions occur in the present invention.

A liquid piston engine is described in an article written by C. D. West titled "Liquid Piston Stirling Engine" *Popular Science*, 1983, Van Nostarand Reinhold Company, and U.S. Pat. No. 5,127,369 to Goldshtik discloses an engine employing rotating liquid as a piston.

The basic disadvantages of the liquid piston type engines are that the working fluid in such engines alters its quality due to direct contact with combustion products, and the possibility exists for developing hydraulic shocks due to sharp pressure change in the combustion chamber. Therefore, employment of these types of engines in transportation is highly problematic.

Gas turbine low-power engines are also not suitable for use as a main engine for transportation because the torque is produced by force developed by gas flowing about turbine wheel blades which gives them low acceleration characteristics. Moreover, gas turbines engines have very high speed (RPM), and rather low effective efficiency, particularly the single stage turbine engine.

Torque in the present engine, unlike the conventional turbine engine, is produced by force induced by the normal pressure of expanding gas on the surface of "sliding blades" that governs its high engine pick up, and this force is transmitted directly to a power take-off shaft without using a crankshaft, unlike conventional piston engines. The low-speed, kinematic, and characteristic properties of the working process of the present engine make it practically noiseless.

The present engine retains the following advantages of a gas turbine engine over a piston type engine:

1. High volumetric efficiency.
2. Friction free sliding.
3. Ability to work while overloaded.
4. May employ a variety of types of combustible hydrocarbon gas or liquid fuels.
5. Has reduced quantities of environmentally damaging emissions.

The present engine also has the following significant advantages over gas turbine low-power engines at equal starting parameters:

1. Low RPM, allowing simplified engine design because a gear box is not required.
2. Moderate velocity of exhaust stream, which increases internal efficiency and decreases noise level.
3. Ease of fabricating sliding blades compared to blades for conventional turbines and compressors.
5. Substantially increased engine pick-up.

Various types of vane heat engines are also known in the art, in which the work of expansion or compression is carried out in an oval-shaped working chamber formed by static surfaces in the engine body and the outer surface of a cylindrical rotor eccentrically positioned in the cavity. In most vane type heat engines, the forces arising from gas expansion or compression are absorbed by vanes which are positioned in rotor slots and reciprocate radially when the rotor rotates.

Allen, U.S. Pat. No. 5,336,059 discloses a vane-type rotary heat driven compressor; Boehling, U.S. Pat. No. 5,325,671 discloses a vane-type rotary heat engine; and Christopher et al, U.S. Pat. No. 4,037,415 discloses a vane-type implosion rotary engine.

The principal disadvantage of such engines is that the vane reciprocating movement is done by force resulting from reacting the vane tips against the solid fixed surface of the engine body. As the engine operates, the vane tips (even though equipped with special points) are subjected to intensive abrasive wear-out as a result of unlubricated friction, especially at high gas temperatures and gas contamination.

Moreover, the inlet and outlet ports in such engine designs cannot be made tangentially in the direction of rotor rotation, but rather at an angle to the rotor rotation plane in the walls of the operating chamber. This causes additional hydrodynamic losses while throttling, and decreases the efficient filling of the operating chamber of the turbine and compressor.

SUMMARY OF THE INVENTION

It is therefore an object of the present invention to provide a sliding-blade heat engine with vortex combustion chamber which is small and light and can generate a large amount of power.

It is another object of this invention to provide a sliding-blade heat engine with vortex combustion chamber which will reduce environmentally damaging emissions.

Another object of this invention is to provide a sliding-blade heat engine with vortex combustion chamber which may employ a variety of types of combustible hydrocarbon gas or liquid fuels, including processed products of agriculture.

A further object of this invention is to provide a sliding-blade heat engine with vortex combustion chamber which has improved fuel efficiency.

A still further object of this invention is to provide a sliding-blade heat engine with vortex combustion chamber which is inexpensive to manufacture in mass production and is inexpensive to operate, service, and repair.

Other objects of the invention will become apparent from time to time throughout the specification and claims as hereinafter related.

The above noted objects and other objects of the invention are accomplished by a sliding-blade heat engine having a vortex combustion chamber and oval-shaped turbine and compressor chambers with cylindrical turbine and compressor rotors rotatably mounted eccentrically therein. Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by a shafts in concentric relation whereby rotation of the turbine rotor causes simultaneous rotation of the compressor rotor and the guide elements traveling in the guide grooves cause the blades to extend and retract radially with their outer ends following the inner periphery of the respective chamber side wall with a constant clearance. The turbine rotor is rotated by working fluid from the vortex combustion chamber which causes rotation of the compressor rotor. Rotation of the compressor rotor draws air into the compressor chamber, compresses it, and discharges it. The discharged compressed air is mixed with a portion of heated working fluid discharged from the turbine chamber in a thermal exchange recuperator and the heated compressed air is conducted to the combustion chamber.

DESCRIPTION OF THE PREFERRED EMBODIMENT

Figure 1:
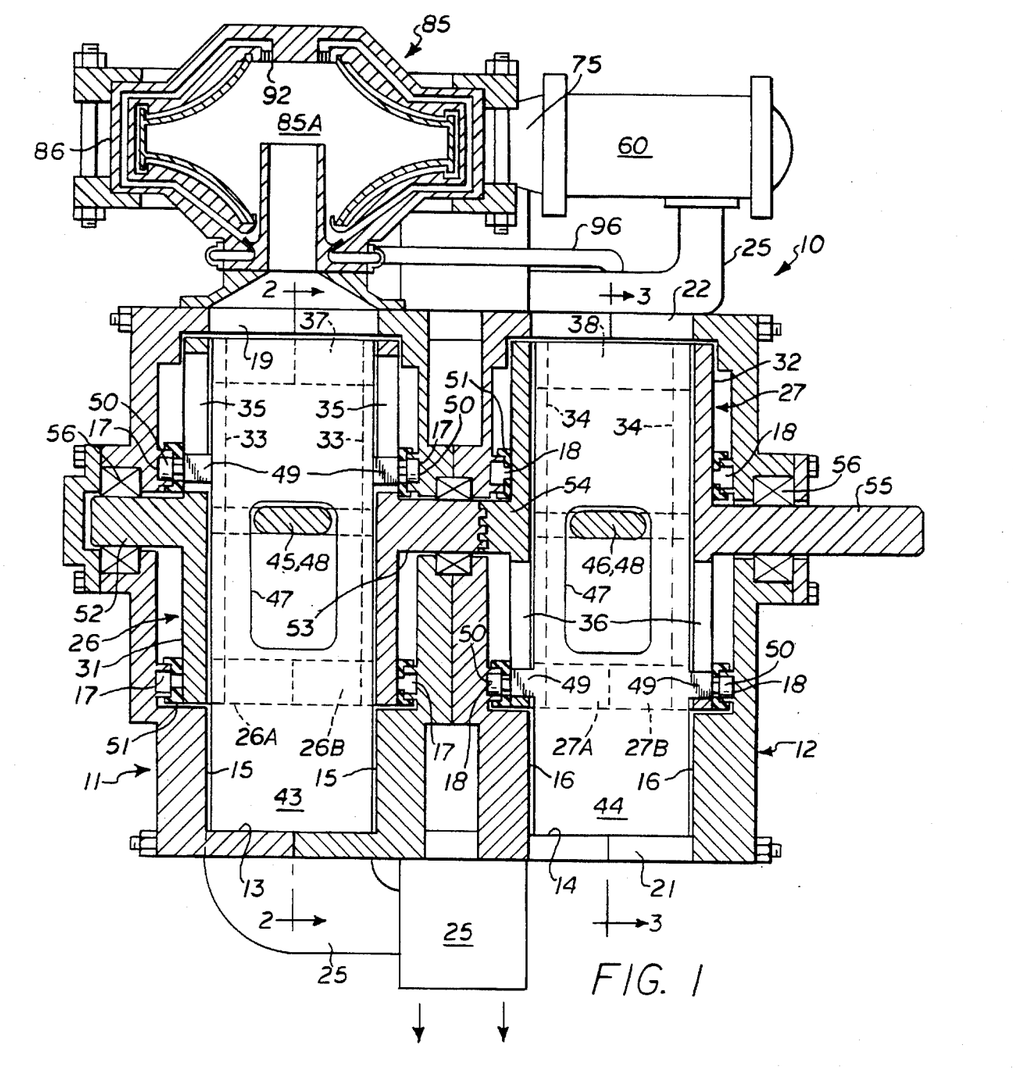
FIG. 1 is a vertical cross section of the sliding-blade heat engine with vortex combustion chamber in accordance with the present invention.
Figure 2:
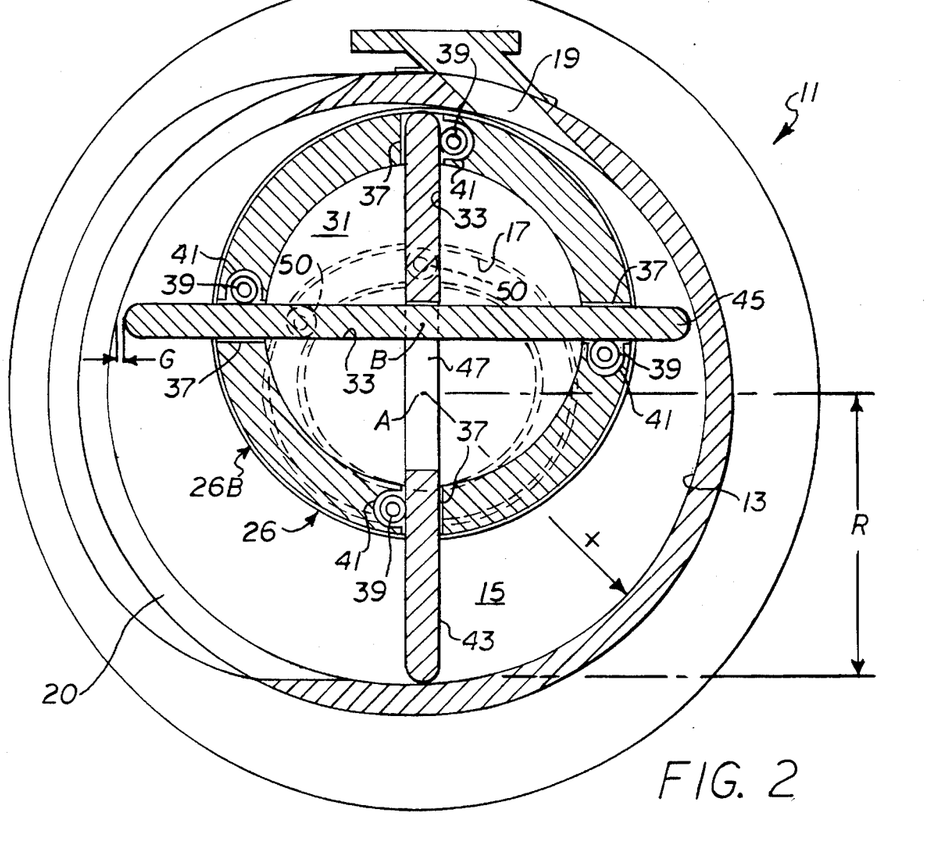
FIG. 2 is a vertical cross section through the turbine chamber of the sliding-blade heat engine taken along line 2—2 of FIG. 1.
Figure 3:
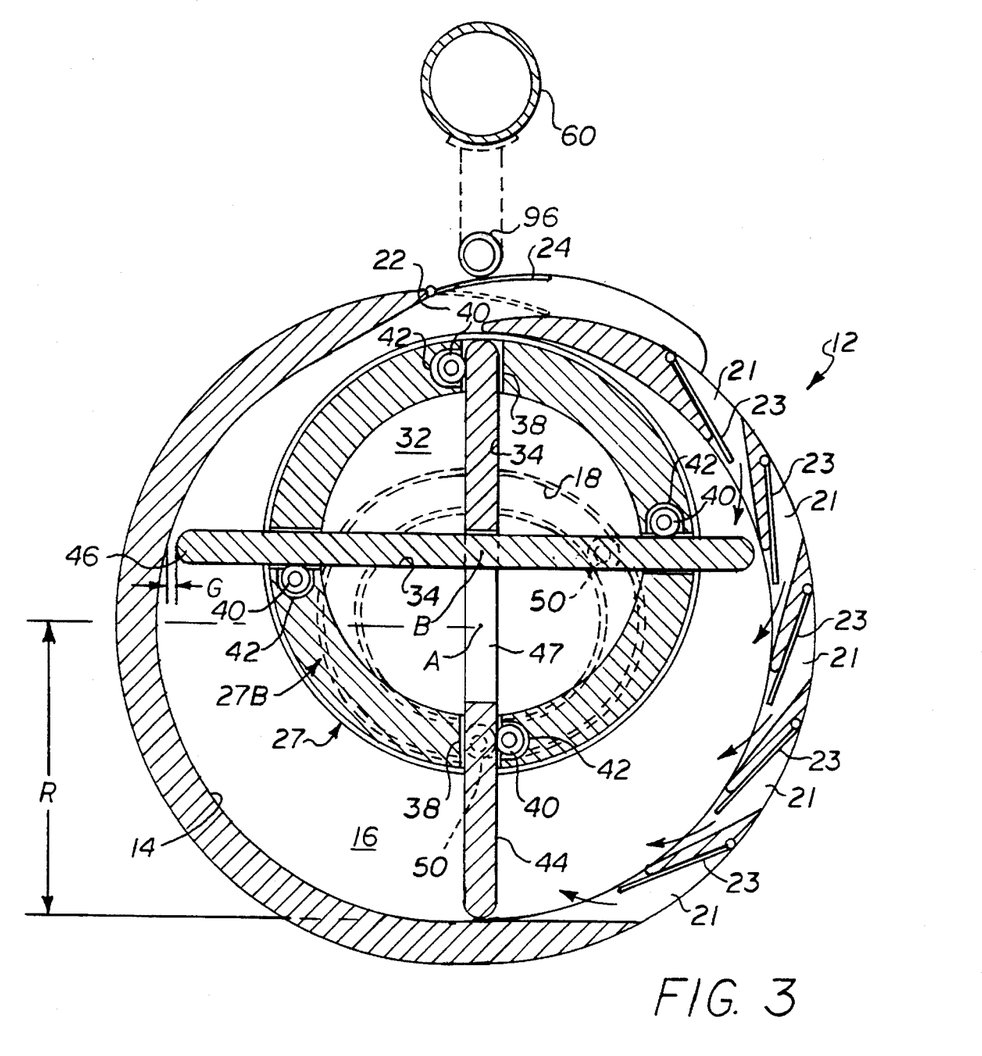
FIG. 3 is a vertical cross section through the compressor chamber of the sliding-blade heat engine taken along line 3—3 of FIG. 1.

Referring to the drawings by numerals of reference, a sliding-blade heat engine with vortex combustion chamber in accordance with the present invention is shown in vertical cross section in FIGS. 1, 2, and 3. The engine 10 has an oval-shaped turbine operating chamber 11 and an adjacent compressor operating chamber 12. The turbine operating chamber 11 (FIG. 2) and the compressor operating chamber 12 (FIG. 3) are each defined by oval shaped cavities having contoured oval-shaped side walls 13 and 14 and opposed facing flat end walls 15 and 16, respectively.

Continuous guide grooves 17 and 18 are formed in the opposed interior surfaces of the flat end walls 15 and 16 of the turbine operating chamber 11 and combustion operating chamber 12, respectively. The interior and exterior peripheral surfaces of the guide grooves 17 and 18 are raised above the flat surface.

As best seen in FIG. 2, the turbine chamber 11 has an inlet port 19 through its side wall 13 positioned at an angle to allow entry of the working medium into the chamber tangentially to the plane of rotation and a relatively large outlet port 20 which extends circumferentially along approximately one-half of its side wall and allows the working medium to exit tangential to the plane of rotation. The width of the inlet port 19 and outlet port 20 are approximately the same width as the turbine chamber 11 to provide maximum filling of the volume of the chamber and minimize hydrodynamic loss.

As best seen in FIG. 3, the compressor chamber 12 has a series of air intake ports 21 circumferentially spaced along approximately one-half of its side wall 14 each positioned at an angle to allow entry of air into the chamber tangential to the plane of rotation and an angular air exhaust port 22 through its side wall which allows the air to exit tangentially to the plane of rotation. The width of the air intake ports 21 and exhaust port 22 are approximately the same width as the compressor chamber 12 to provide maximum filling of the volume of the chamber and minimize hydrodynamic loss.

Each of the air intake ports 21 is provided with a one-way valve 23 which allows air to flow only into the compressor chamber 12 and the exhaust port 22 is provided with a one-way valve 24 which allows air to flow only out of the compressor chamber. The turbine exhaust port 20 is connected with the compressor exhaust port 22 through a thermal exchange recuperator 25 which is connected with a pre-combustion chamber (described hereinafter).

A sliding blade turbine rotor 26 and a sliding blade compressor rotor 27 are rotatably disposed in the respective turbine operating chamber 11 and compressor operating chamber 12.

Figure 4:
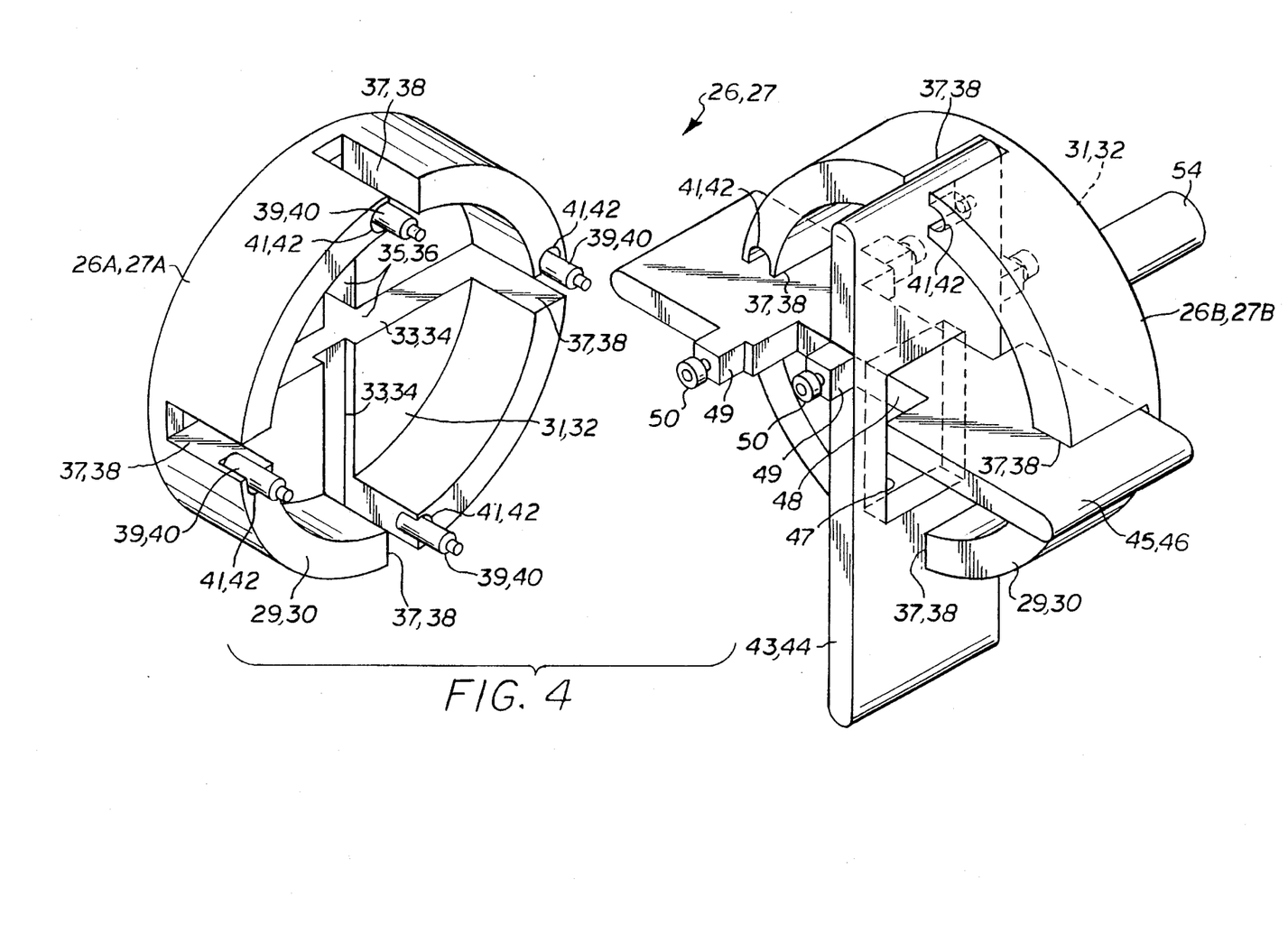
FIG. 4 is an exploded isometric view of the turbine and compressor rotor of the sliding-blade heat engine shown in an unassembled condition.
Figure 5:
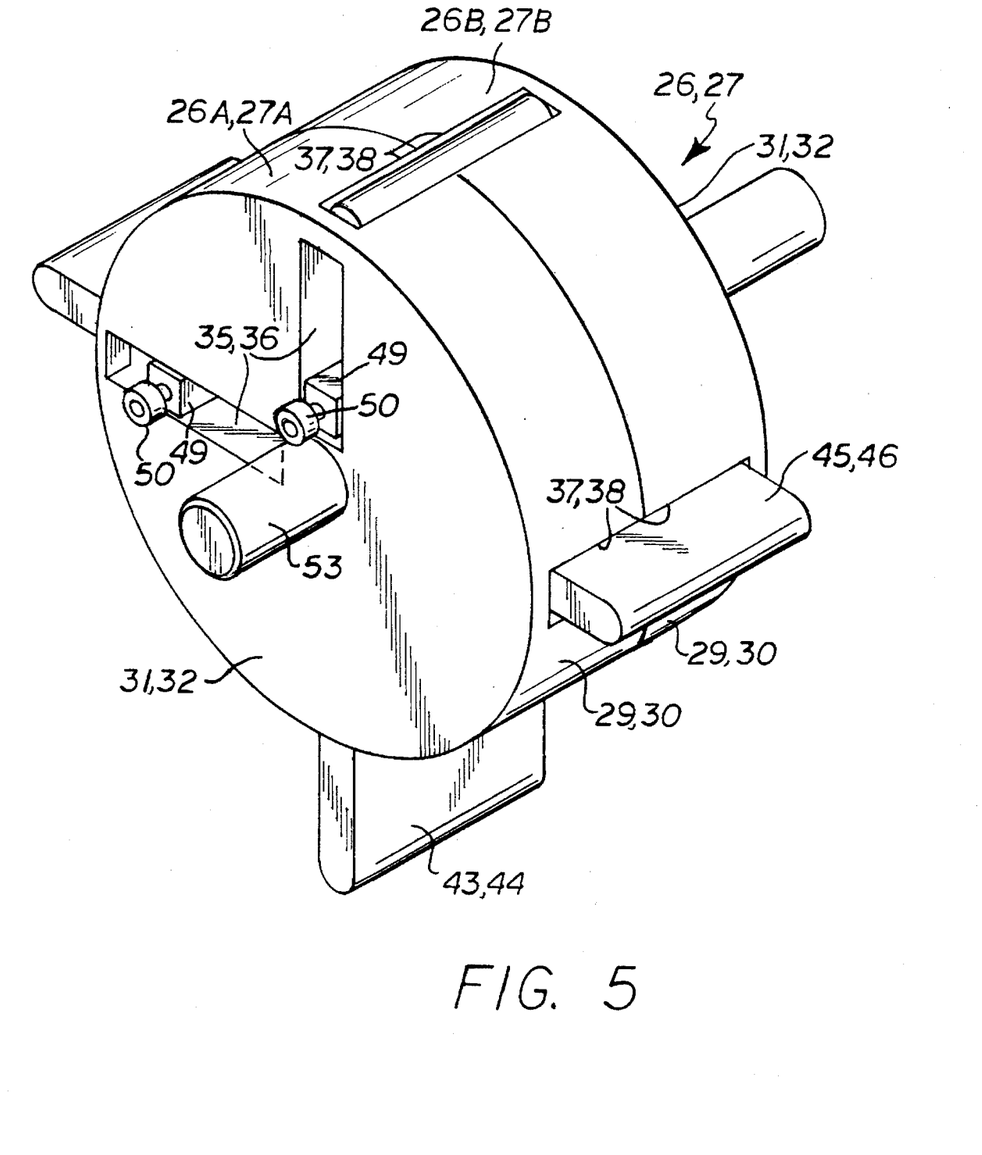
FIG. 5 is an isometric view of the turbine and compressor rotor of the sliding-blade heat engine shown in an assembled condition.

As best seen in FIGS. 4 and 5, the turbine rotor 26 and compressor rotor 27 are each formed by a pair of opposed hollow cylindrical members 26A, 26B and 27A, 27B, respectively, each having a circular side wall 29 and 30 and an end wall 31 and 32. A pair of perpendicular elongate rectangular slots 33 and 34 are formed in the interior surface of the end walls 31 and 32 of the cylindrical members 26A, 26B, and 27A, 27B and extend through the center of rotation of the cylindrical members. A portion of the slots 33 and 34 on one side of the center of rotation extend all the way through the flat end walls 31 and 32 of the cylindrical members 26A, 26B and 27A, 27B to form a pair of rectangular perpendicular slots 35 and 36 through the outer surface of the flat end walls 31 and 32, as best seen in FIG. 5.

A series of circumferentially spaced rectangular slots 37 and 38 extend through the circular side walls 29 and 30 of the circular members 26A, 26B and 27A, 27B from their open end and terminate at the flat end walls 31 and 32 in axial alignment with the slots 33 and 34 in the flat end walls.

Rollers 39 and 40 are mounted in recesses 41 and 42 in the side walls 29 and 30 of the cylindrical members 26A, 26B and 27A, 27B closely adjacent each slot 37 and 38 with their curved exterior surface protruding a short distance into the slot opening (FIGS. 2, 3, and 4).

A pair of perpendicular elongate rectangular rigid blades 43, 44, and 45, 46 are slidably received in the elongate slots 33 and 34, respectively. One blade 43, 45 of each pair is provided with a central rectangular opening 47 and the other blade 44, 46 of each pair is provided with a central narrow rectangular portion 48 which is received through the opening 47 such that the perpendicular blades 43, 44, and 45, 46, can slide independently relative to one another. A foot lug 49 extends outwardly a short distance from the opposed side edges of each blade 43, 44, and 45, 46 in opposed relation, and a roller 50 is rotatably mounted at the outer end of each lug.

As shown in FIG. 5, the circular members 26A, 26B and 27A, 27B are secured together in opposed relation over the blades 43, 44 and 45, 46 to form a circular drum configuration. The outer ends of the blades 43, 44 and 45, 46 extend slidably through the slots 37 and 38 in the circular side walls 29 and 30 and are supported on opposed sides by the rollers 39, 40 as seen in FIGS. 2 and 3. In the assembled condition, the lugs 49 and rollers 50 extend through the slots 35 and 36 in the flat end walls 31 and 32 and the rollers 50 are received and travel in the continuous guide grooves 17 and 18 in the opposed interior surfaces of the flat end walls 15 and 16 of the turbine operating chamber 11 and combustion operating chamber 12, respectively, as seen in FIG. 1. An elastomeric seal collar 51 is installed on the raised interior and exterior peripheral surfaces of the guide grooves 17 and 18 and forms a fluid sealing relation against the exterior surfaces of the end walls 31 and 32 of the cylindrical members 26A, 26B and 27A, 27B.

As best seen in FIG. 1, a shaft 52 secured to the exterior of the flat end wall 31 of one of the turbine rotor cylindrical members 26A extends outwardly from its center through a hole in the flat end wall 15 of the turbine chamber 11 and a coaxial opposed shaft 53 secured to the exterior of the opposed flat end wall 31 of the opposed cylindrical member 26B extends outwardly from its center through a hole in the opposed flat end wall 15 of the turbine chamber 11. Similarly, a shaft 54 secured to the exterior of the flat end wall 32 of one of the compressor rotor cylindrical members 27A extends outwardly from its center through a hole in the flat end wall 16 of the compressor chamber 12 and a coaxial opposed shaft 55 secured to the exterior of the opposed flat end wall 32 of the opposed cylindrical member 27B extends outwardly from its center through a hole in the opposed flat end wall 16 of the compressor chamber 12. The shafts 52, 53, 54, and 55 are journalled in the engine housing by bearings 56. The shafts 53 and 54 of the turbine rotor 26 and compressor rotor 27 are joined together by splines or other suitable means such that the rotors rotate together.

The centerline "B" of the shafts 52–55 and rotors 26 and 27 is eccentrically offset from the center of the oval-shaped turbine and compressor chambers 11 and 12.

When the turbine and compressor rotors 26 and 27 turn, the blades 43, 44, and 45, 46 reciprocate radially resting on the rollers 39, 40 mounted in the side walls 29, 30 of the cylindrical members 26A, 26B and 27A, 27B to form four vane blades of variable length in the respective operating chamber and function as pistons during the compression and expansion of the working medium. The radial travel of the blades 43, 44 and 45, 46 is regulated by the guide grooves 17 and 18 in which the rollers 50 at the ends of the lugs 49 of each blade travel.

Figure 2A:
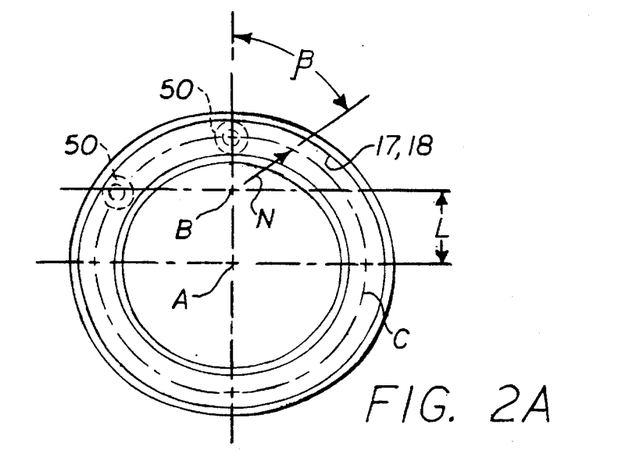
FIG. 2A is a partial elevation of the guide groove formed in the end walls of the turbine and compressor chambers of the sliding-blade heat engine.

Referring now to FIGS. 2, 2A, and 3, the centerline "B" of the shafts 52–55 and rotors 26 and 27 is eccentrically offset from the center of the oval-shaped turbine and compressor chambers 11 and 12 by a distance L. The sliding blades 43, 44, and 45, 46, of the turbine rotor 26 and compressor rotor 27 are of a predetermined length to provide a clearance gap "G" between the outer tip ends of the blades and the interior surface of the oval side walls 13 and 14 of the turbine chamber 11 and compressor chamber 12, respectively.

In the preferred embodiment, the centerline "C" of the guide grooves 17 and 18 in the rotation plane of the turbine and compressor rotors 26 and 27 is defined by the equation:

$$N = H + L(1 - \cos \beta)$$

Where $N$=distance from the center of rotor rotation (point B) to the centerline C of the groove, H=constant design value, L=eccentricity, and β=rotor swing angle from the contiguity point of the outer surface of the cylindrical drum and the inner surface of the chamber side walls 13 and 14.

The inner surfaces of the turbine and compressor chamber side walls 13 and 14 in the rotation plane of the rotor are calculated and configured according to the equation:

$$X = \sqrt{R^2 + (L \times \sin\beta)^2}$$

Where

X=a variable distance between the inner surface of the chamber side walls 13 and 14 in a plane extending through the center of symmetry (point A) of the oval surfaces, R=one-half of the shorter axis of the oval, L=eccentricity, and β=rotor swing angle from the contiguity point of the outer cylindrical surface of the drum and the inner surface of the chamber side walls 13 and 14.

Figure 6:
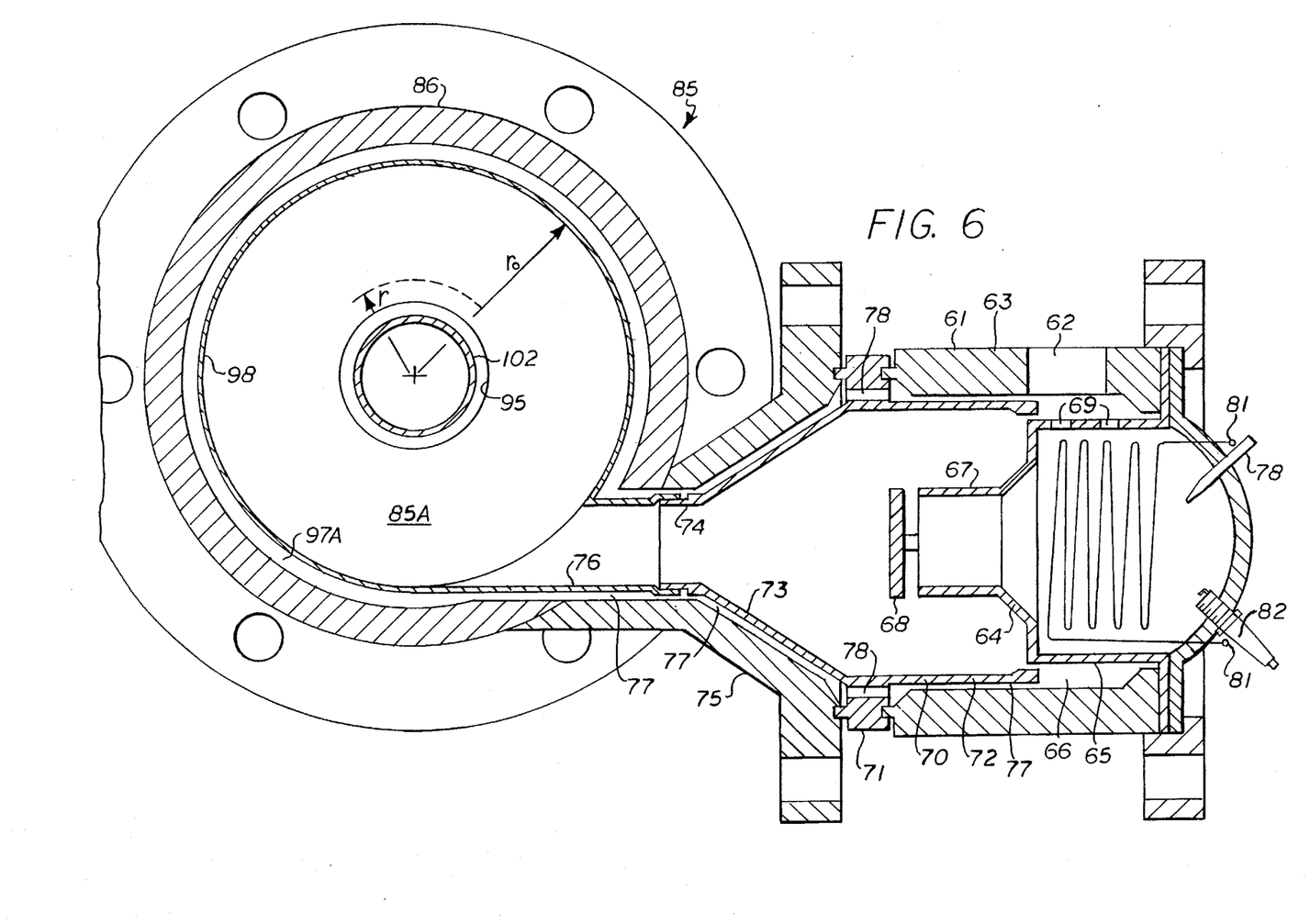
FIG. 6 is a horizontal cross section through the precombustion chamber and vortex combustion chamber of the sliding-blade heat engine.

Referring again to FIG. 1, and additionally to FIGS. 6 and 7, the vortex combustion chamber 85 and pre-combustion chamber 60 will be described. The vortex combustion chamber 85 is connected to a straight-flow pre-combustion chamber 60. The pre-combustion chamber 60 is used for primary mixing, ignition, and combustion of heavy and low grade fuels.

The pre-combustion chamber 60 has a hollow cylindrical outer housing 61 enclosed at one end with an air inlet 62 through its side wall 63. A hollow cylindrical combustion stabilizer 64 is secured within the outer housing 61 and has a large diameter side wall 65 spaced radially inward from the outer housing defining an annulus 66 therebetween and has a reduced diameter neck portion 67 at one end and a disk-shaped member 68 positioned a distance from the neck portion. A plurality of air inlet ports 69 extend through the larger diameter side wall 65 in communication with the air inlet 62 of the outer housing 61.

A funnel-shaped flame tube 70 is secured to the open end of the outer housing 61 by a radial flange 71 and has a hollow cylindrical side wall portion 72 received within the open end of the outer housing 61, a conical side wall portion 73, and a reduced diameter neck portion 74 at one end. The radial flange 71 is secured between the open end of the outer housing 61 and a conical flanged fitting 75 on the outer housing of the vortex combustion chamber 85. The conical side wall portion 73 of the flame tube 70 is received within the conical flanged fitting 75 and the reduced diameter neck portion 74 is connected with a tubular channel 76 disposed tangential to the periphery of the central cavity 85A of the vortex combustion chamber 85.

The exterior of the cylindrical side wall portion 72 is spaced radially inward from the interior of the outer housing 61 and the conical side wall portion 73 and reduced neck portion 74 is spaced radially inward from the interior of the conical flanged fitting 75 to define an annulus 77 therebetween. A plurality of passageways 78 extend through the radial flange 71 to allow communication through the annulus 77.

The combustion stabilizer 64 is provided with a fuel injector 78, a fuel vaporizer 80 having terminals 81 extending from the pre-combustion chamber 60 which are connected with a source of electrical current (not shown), and a fuel igniter or spark plug 82. A portion of air from the general air flow is drawn into the combustion stabilizer 64 through opening 62 and air inlets 69 to create an air-fuel mixture near the spark plug 82. The fuel vaporizers 80 and spark plug 82 are used to start the engine in cold seasons if a heavy fuel is used.

Figure 7:
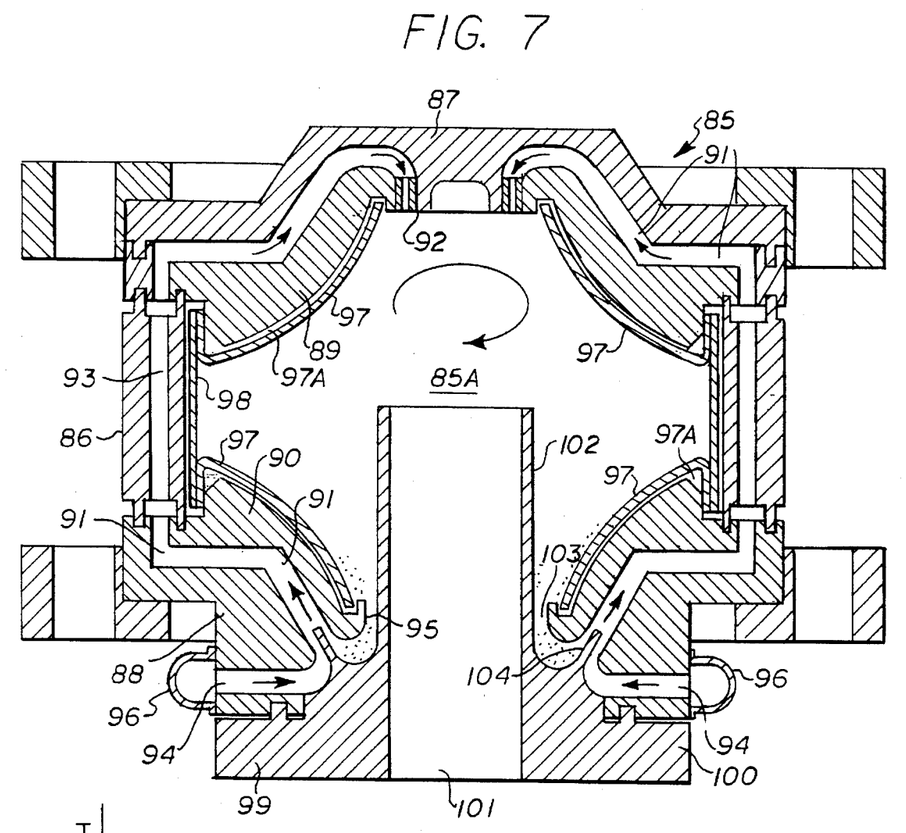
FIG. 7 is a vertical cross section through the vortex combustion chamber of the sliding-blade heat engine.

As best seen in FIG. 7, the vortex combustion chamber 85 receives a rich mixture of fuel and air formed in the pre-combustion chamber 60 for after-burning. The vortex combustion chamber 85 has a cylindrical outer housing 86 enclosed at the top end by outer top end wall 87 and at the bottom end by outer bottom wall 88. An inner top wall 89 and an inner bottom wall 90 are secured within the outer top and bottom walls 87 and 88 in spaced apart relation to define a flow passageway 91 therebetween. A swirl nozzle 92 is secured in the passageway 91 between the outer top wall 87 and inner top wall 89. A plurality of passageways 93 extend longitudinally through the side wall of the cylindrical outer housing 86 to allow communication through the flow passageway 91. Passageways 94 extend radially inward from the exterior of the outer bottom wall 88 in communication with the flow passageway 91. The inner bottom wall 88 is provided with a central opening 95 in communication with the flow passageway 91 and radial passageways 94. A bypass conduit 96 connects the radial passageways 94 to the compressed air flow entering the pre-combustion chamber 60 from the compressor chamber 12.

A liner 97 is secured to the interior surfaces of the cylindrical outer housing 86, inner top wall 89 and inner bottom wall 90. The cylindrical side wall 98 of the liner 97 is joined tangentially to the tubular channel 76 and serves as a cylindrical heat tube. The fuel and air mixture from the pre-combustion chamber 60 is caused to swirl as it enters the interior of the vortex combustion chamber 85 through the tubular channel 76.

As best seen in FIG. 7, the vertically opposed interior surfaces of the liner 97 and the inner top wall 89 and inner bottom wall 90 have opposite facing outwardly concave curved surfaces with the axial distance between the curved surfaces increasing inversely from their periphery with respect to the radial distance. In a preferred embodiment, the vertically opposed interior surfaces of the liner 97, and inner top and bottom walls 89 and 90 are curved or contoured according to the following equation:

h(r)=r$_o$/r exp $$h(r) = r_o/r \exp\left[\int_r^{r_o} M_t(r)dr/r\right]$$

Where h=current distance between end walls, r$_o$=maximal radius of combustion chamber cavity 85A, r=current radius of combustion chamber cavity 18A, and M$_t$=vortex tangential velocity Mach number.

The optimal end wall profile, h=h(r) can be determined from this equation for any given radial temperature distribution.

A collector member 99 is secured to the outer bottom wall 88 of the vortex combustion chamber 85. The collector member 99 has a bottom flange 100 and a central bore 101 which is connected to the inlet port 19 of the turbine chamber 11 and a tubular extension 102 which extends upwardly therefrom through the central opening 95 in the inner bottom wall, defining an annulus 103 therebetween, and terminates at approximately the center of the vortex combustion chamber. The juncture of the tubular extension 102 and the bottom flange 100 is contoured and has an annular raised lip ring 104 which extends angularly upwardly therefrom and a distance into the passageway 91 between the inner bottom wall 90 and outer bottom wall 88 of the vortex combustion chamber 85. The interior of the tubular extension 102 serves as the outlet pipe for the near-axis zone of the vortex combustion chamber 85. The passageways 91, 93 and 94 form an isolated fuel-air recirculation channel which passes around the interior of the vortex combustion chamber 85.

As described hereinafter, a portion of the air from the compressor chamber 12 is directed through the bypass conduit 96 and the radial passageways 94 onto the annular raised lip ring 104 which serves as a fuel-air ejector ring and causes a venturi effect to return trapped fuel film through the recirculation channel 91, 93, 94 and swirl nozzle 92 back into the chamber combustion zone. The swirl nozzle 92 swirls the recirculated fuel-air mixture flowing through the recirculation channel 91, 93, 94 as it enters the interior of the vortex combustion chamber 85. Because the swirl nozzle 92 is located in the near-axis zone of the vortex combustion chamber 85 where re-refraction occurs the fuel-air ejector ring 104 is subjected to substantial pressure drop and it's operation is intensified.

OPERATION

To start the engine, fuel is introduced into the combustion stabilizer 64 through the fuel injector 78 and a portion of air from the general air flow is drawn into the pre-combustion chamber 60 through the opening 62 and into the combustion stabilizer 64 through air inlets 69 to create an air-fuel mixture near the spark plug 82 and the spark plug is activated to ignite the mixture. In cold seasons, the fuel vaporizer 80 and spark plug 82 may used to start the engine if a heavy fuel is used.

The ignited fuel-air mixture formed in the combustion stabilizer 64 of the pre-combustion chamber 60 then passes across the disk-shaped member 68, through the interior of the funnel-shaped flame tube 70, and through the channel 76 tangentially into the vortex combustion chamber 85 for after-burning. The air also flows through the annulus 66, 77 and passageways 78 between the flame tube 70 and the outer housing 61 and the conical flanged fitting 75 on the outer housing 86 of the vortex combustion chamber 85 and the annulus 97A surrounding the liner 97, and thereby cooling the flame tube 70 and liner 97.

The products of combustion from the pre-combustion chamber 60 are caused to form a swirling vortex as they enter the vortex combustion chamber cavity 85A through the tangential channel 76. The axially inward contoured walls 89, 90 and liner 97 of the vortex combustion chamber cavity 85A, and the equinoctial condition of the centrifugal and aerodynamic forces acting on the condensed particles in the vortex stream of air in the vortex combustion chamber cavity allow unvaporized fuel droplets to be confined in equilibrium in the orbit of rotation for a sufficient length of time such that fuel droplet migration to a small radius will only occur when the droplet diameters become sufficiently small during the combustion process. This feature is a considerably effective factor in stabilizing combustion and providing a high degree of completeness of combustion.

The working fluid entering the turbine chamber 11 acts on the blades 43, 45 causing rotation of the turbine rotor 26 and through the shafts 53 and 54 causes simultaneous rotation of the compressor rotor 27. The sliding blades 43, 44, and 45, 46 move radially relative to one another guided by the guide grooves 17 and 18, as described in detail previously. The sliding blades 43, 44 and 45, 46 of the turbine and compressor rotors 26 and 27 function as pistons during the compression and expansion of the working medium and air inside the respective chambers. The working fluid is exhausted from the turbine chamber 11 through the large exhaust port 20. The turbine exhaust port 20 is connected with the compressor exhaust port 22 through a thermal exchange recuperator 25 which is connected with the pre-combustion chamber 60.

Figure 8:
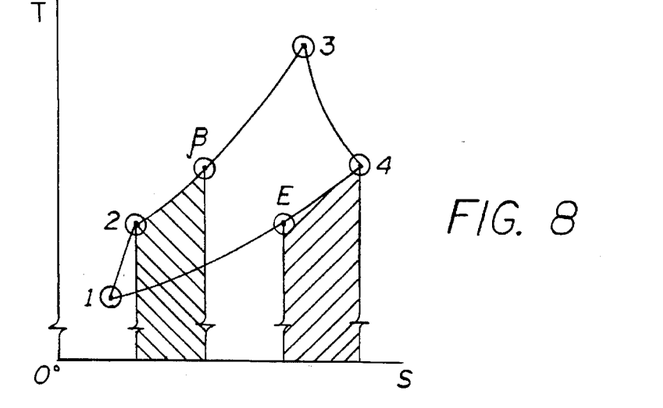
FIG. 8 is a diagram of the thermodynamic cycle of the sliding-blade heat engine with vortex combustion chamber.

Referring now to FIGS. 2, 3, and the thermodynamic diagram of FIG. 8, as the compressor rotor 27 turns, a large volume of air is drawn in through the plurality of air intake ports 21 (point 1 in FIG. 8) and as it travels around the diminishing volume of the oval-shaped compressor chamber 12 is compressed and discharged through the exhaust port 22 and valve 24 into the thermal exchange recuperator 25 (point 2 in FIG. 8) where it accepts part of the exhaust heat from the exhaust of the turbine chamber 11 (point b in FIG. 8) and enters the pre-combustion chamber 60. Hot working medium from the vortex combustion chamber 85 enters the turbine chamber 11 through the inlet port 19 (point 3 in FIG. 8). Exhaust gases from the turbine chamber 11 enter the thermal exchange recuperator 25 and after transferring a portion of the heat to the compressed air (point 4 in FIG. 8), leave the engine through port 20 (point E in FIG. 8).

Referring again to FIG. 7, in the combustion process a portion of the fuel not participating in mixing and combustion moistens the inner walls of the liner 97 and exterior of the tubular extension 102 in the vortex combustion chamber 85, and in the form of a migrating film of unmixed and uncombusted fuel, migrates to the lower portion of the chamber and is captured at the inward side of the annular raised lip ejector ring 104. A portion of the air from the compressor chamber 12 is directed through the bypass conduit 96 and the radial passageways 94 onto the outward side of the annular raised lip ejector ring 104 and causes a venturi effect to return the trapped unmixed and uncombusted fuel as a fuel-air mixture through the recirculation channel 91, 93, 94 and swirl nozzle 92 back into the chamber combustion zone. The swirl nozzle 92 swirls the recirculated fuel-air mixture flowing through the recirculation channel 91, 93, 94 as it enters the interior of the vortex combustion chamber 85. Because the swirl nozzle 92 is located in the near-axis zone of the vortex combustion chamber where re-refraction occurs, the fuel-air ejector ring 104 is subjected to substantial pressure drop and it's operation is intensified.

The combination of the structural and operational features of the present sliding-blade engine, vortex combustion chamber, and annular raised lip ejector ring substantially eliminate completely unburned fuel emissions and provide improved completeness of combustion of various fuels at a large coefficient of air redundancy value ($\alpha$).

It should be understood, that although the turbine and compressor rotors have been shown and described with a pair of blade members, the rotors may utilize any number of blades.

While this invention has been described fully and completely with special emphasis upon a preferred embodiment, it should be understood that within the scope of the appended claims the invention may be practiced otherwise than as specifically described herein.

We claim:

1. A sliding-blade heat engine comprising:
 a vortex combustion chamber for mixing a fuel with air, igniting the mixture, and discharging the heated product as a working fluid;

an oval-shaped turbine chamber having a peripheral side wall which is oval-shaped in cross section, parallel opposed facing flat end walls, and a continuous guide groove formed in each said end wall;

a cylindrical turbine rotor having a circular side wall, parallel opposed flat end walls, a concentric shaft extending outwardly from each said end wall, and at least two mutually perpendicular slots extending radially through said turbine rotor with a radial extending portion of each said slot extending through said end walls, said turbine rotor rotatably mounted by said shafts eccentrically in said turbine chamber relative to the major axis of said turbine chamber;

at least two elongate rectangular turbine blades, one slidably mounted in each of said slots extending through said turbine rotor in mutually perpendicular relation and each independently movable relative to the other in a radial direction, each said turbine blade having a guide element extending from opposed sides and through said radial extending portion of each said slot outwardly from said turbine rotor end walls and slidably received in said guide groove in said turbine chamber end walls;

an oval-shaped compressor chamber adjacent said turbine chamber having a peripheral side wall which is oval-shaped in cross section, parallel opposed facing flat end walls, and a continuous guide groove formed in each said end wall;

a cylindrical compressor rotor having a circular side wall, parallel opposed flat end walls, a concentric shaft extending outwardly from each said end wall, and at least two mutually perpendicular slots extending radially through said compressor rotor with a radial extending portion of each said slot extending through said end walls, said compressor rotor rotatably mounted by said shafts eccentrically in said compressor chamber relative to the major axis of said compressor chamber;

at least two elongate rectangular compressor blades, one slidably mounted in each of said slots extending through said compressor rotor in mutually perpendicular relation and each independently movable relative to the other in a radial direction, each said compressor blade having a guide element extending from opposed sides and through said radial extending portion of each said slot outwardly from said compressor rotor end walls and slidably received in said guide groove in said compressor chamber end walls;

said turbine rotor and said compressor rotor connected together by said shafts in concentric relation whereby rotation of said turbine rotor causes simultaneous rotation of said compressor rotor, and upon rotation of said turbine and compressor rotors said guide elements traveling in said guide grooves causing said turbine blades and said compressor blades to extend and retract radially with their outer ends following the inner periphery of the respective oval-shaped side walls of said turbine chamber and said compressor chamber with a constant clearance between the outer tip ends of said blades and said inner peripheries;

working fluid inlet and outlet means formed in said turbine chamber side wall configured to receive a working fluid from said combustion chamber tangentially to the axis of rotation of said turbine rotor and impart a force on said turbine blades to cause rotation of said turbine rotor and to discharge the working fluid tangentially to the axis of rotation of said turbine rotor;

air inlet and outlet means formed in said compressor chamber side wall configured to draw air into said compressor chamber tangentially to the axis of rotation of said compressor rotor upon rotation thereof, and as rotation continues said compressor blades compressing the air drawn into in said compressor chamber and discharging the compressed air through said air outlet means; and thermal exchange recuperator means connected with said air outlet means, said working fluid outlet means, and said combustion chamber to mix compressed air discharged from said compressor chamber with a portion of heated working fluid discharged from said turbine chamber and conduct the heated compressed air to said vortex combustion chamber.

2. The engine according to claim 1 wherein said continuous guide grooves having a centerline in the plane of rotation defined by the equation:

$$N = H + L(1 - \cos \beta)$$

where
N=distance from the center of rotor rotation to the centerline of the groove,
H=constant design value,
L=eccentricity of the center of rotor rotation relative to the central axis of the chamber,
$\beta$=rotor swing angle from the contiguity point of the circular surface of the rotor and the inner surface of the oval-shaped chamber side walls.

3. The engine according to claim 1 wherein the inner periphery of said oval-shaped side walls of said turbine and compressor chambers in the plane of rotor rotation is configured according to the equation:

$$X = \sqrt{R^2 + (L \times \sin\beta)^2}$$

where
X=a variable distance between the inner periphery of the chamber in a plane extending through the center of symmetry of the oval-shaped side wall,
R=one-half of the minor axis of the oval,
L=eccentricity of the center of rotor rotation relative to the central axis of the chamber,
$\beta$=rotor swing angle from the contiguity point of the circular surface of the rotor and the inner surface of the oval-shaped chamber side walls.

4. The engine according to claim 1 further comprising roller means on said turbine rotor and said compressor rotor disposed adjacent said radially extending slots and engaged with said blades to support and facilitate extension and retraction thereof.

5. The engine according to claim 1 further comprising roller means at the outer ends of said turbine blade and said compressor blade guide elements rotatably engaged in said guide grooves in said turbine chamber and said compressor chamber end walls.

6. The engine according to claim 1 further comprising lubricant seal means surrounding each said guide groove disposed between the inner surface of each said chamber end wall and the outer surface of each said rotor end wall to form a lubricant sealing relation therebetween.

7. The engine according to claim 1 wherein said working fluid inlet and outlet means formed in said turbine chamber side wall is substantially the same width as the width of said turbine chamber, and said air inlet and outlet means formed in said compressor chamber side wall is substantially the same width as the width of said compressor chamber.

8. The engine according to claim 1 further comprising valve means connected with said compressor chamber inlet means to allow air to flow only into said compressor chamber, and valve means connected with said compressor chamber outlet means to allow air to flow only out of said compressor chamber.

9. The engine according to claim 1 wherein said vortex combustion chamber is a generally cylindrical member having a circular side wall surrounding a central chamber, vertically spaced top and bottom walls having opposite facing outwardly concave curved surfaces with the axial distance between said curved surfaces increasing inversely from their periphery with respect to the radial distance, working fluid inlet means positioned tangentially to said circular side wall to receive the heated working fluid and cause it to swirl as it enters said central chamber, and working fluid outlet means connected with said working fluid inlet means in said turbine chamber side wall to discharge the working fluid tangentially into said turbine chamber.

10. The engine according to claim 9 further comprising a pre-combustion chamber having fuel inlet means to introduce a combustible fuel thereinto, air inlet means to introduce air thereinto and mix it with said fuel to produce a fuel-air mixture, fuel ignition means to ignite said fuel-air mixture to produce said working fluid, and working fluid outlet means connected with said working fluid inlet means of said vortex combustion chamber to discharge said working fluid tangentially into said central chamber.

11. The engine according to claim 9 further comprising collecting means disposed in the near-axis zone of said vortex combustion chamber bottom wall to collect condensed particles of the unmixed and uncombusted fuel-air mixture; and recirculating channel means extending between said collecting means and the near-axis zone of said vortex combustion chamber top wall to recirculate said condensed particles of unmixed and uncombusted fuel-air mixture back into said central chamber to be mixed with the heated swirling working fluid received in said central chamber.

12. The engine according to claim 11 further comprising a swirl nozzle disposed in said recirculating channel means at the near axis-zone of said vortex combustion chamber top wall to swirl said collected condensed particles as they are introduced into said central chamber.

13. The engine according to claim 11 wherein said collecting means is connected with said thermal exchange recuperator means to receive a portion of the heated compressed air being conducted to said vortex combustion chamber; and said collecting means has a surface configured to capture said collected particles and to create a venturi effect in said heated compressed air being received which mixes said collected particles with said heated compressed air and discharges the mixture into said recirculating channel.

14. The engine according to claim 13 wherein said collecting means has a tubular extension extending axially through said working fluid outlet means of said vortex combustion chamber with an inlet end disposed in the near-axis zone of said central chamber and an outlet end connected with said working fluid inlet means in said turbine chamber side wall to discharge the swirling working fluid tangentially into said turbine chamber.

15. In a sliding-blade heat engine having a turbine chamber with a turbine rotor rotatably disposed therein and a compressor chamber having a compressor rotor rotatably disposed therein, a vortex combustion chamber comprising:

a generally cylindrical member having a circular side wall surrounding a central chamber, vertically spaced top and bottom walls having opposite facing outwardly concave curved surfaces with the axial distance between said curved surfaces increasing inversely from their periphery with respect to the radial distance, working fluid inlet means positioned tangentially to said circular side wall to receive a heated working fluid discharged from a pre-combustion chamber and cause it to swirl as it enters said central chamber, and working fluid outlet means connected with said turbine chamber to discharge the swirling working fluid tangentially into said turbine chamber to rotate said turbine rotor;

collecting means disposed in the near-axis zone of said vortex combustion chamber bottom wall to collect condensed particles of the unmixed and uncombusted fuel-air mixture; and recirculating channel means extending between said collecting means and the near-axis zone of said vortex combustion chamber top wall to recirculate said condensed particles of unmixed and uncombusted fuel-air mixture back into said central chamber to be mixed with the heated swirling working fluid received in said central chamber.

16. The engine according to claim 15 further comprising a pre-combustion chamber having fuel inlet means to introduce a combustible fuel thereinto, air inlet means to introduce air thereinto and mix it with said fuel to produce a fuel-air mixture, fuel ignition means to ignite said fuel-air mixture to produce said working fluid, and working fluid outlet means connected with said working fluid inlet means of said vortex combustion chamber to discharge said working fluid tangentially into said central chamber.

17. The engine according to claim 15 further comprising a swirl nozzle disposed in said recirculating channel means to swirl said collected condensed particles as they are introduced into said central chamber.

18. The engine according to claim 15 wherein said collecting means is connected with said compressor chamber to receive a portion of the compressed air discharged therefrom; and said collecting means has a surface configured to capture said collected particles and to create a venturi effect in said compressed air being received which mixes said collected particles with said compressed air and discharges the mixture into said recirculating channel.

19. The engine according to claim 15 wherein said collecting means has a tubular extension extending axially through said working fluid outlet means of said vortex combustion chamber with an inlet end disposed in the near-axis zone of said central chamber and an outlet end connected with said working fluid inlet means in said turbine chamber side wall to discharge the working fluid tangentially into said turbine chamber.

* * * * *